3,346,526
THERMALLY STABLE INKS FOR PRINTING OF POLYVINYL BUTYRAL
Francis T. Buckley, Hampden, and Lionel N. Finch, Springfield, Mass., and Ira L. Seldin, Rochester, N.Y., assignors to Monsanto Company, St. Louis, Mo., a corporation of Delaware
No Drawing. Filed Apr. 21, 1965, Ser. No. 449,857
1 Claim. (Cl. 260—29.1)

This application is a continuation-in-part of copending application S.N. 115,600 filed June 8, 1961, now abandoned.

This invention relates to inks and more particularly to thermally-stable inks useful for printing of polyvinyl butyral sheets.

Shatter-resistant light transmitting laminates for vehicles and the like can be constructed from pairs of glass sheets laminated together through interposed polyvinyl butyral sheets.

A further safety factor can be incorporated into laminates of this type of tinting or coloring the same, which serves to minimize the transmission of glare and other objectionable radiations through the laminates. One method or for accomplishing this broadly involves printing the butyral sheets with an ink of selected color. More particularly, and taking the rotogravure method of printing as illustrative, the ink is transferred from the printing rolls of the press to the surface of the polyvinyl butyral sheet effecting ink surfaces on the polyvinyl butyral sheets which are streaked, dotted, or otherwise matted corresponding with the knurling or etching on the press rolls. In order to diffuse the ink into the polyvinyl butyral sheets and so obtain a solid tinting or coloring effect, the printed sheets are subjected to a seasoning process which usually involves maintaining them at a temperature of 20–60° C. for a period ranging from 3 to 60 days. At 20° C. the longer period is necessary to produce a continuously colored film, while at 60° C. the same is attained in from 3–28 days.

After the polyvinyl butyral sheets have been satisfactorily tinted, they can be then interposed between pairs of glass sheets and the resulting assemblies can be laminated by the application of heat ranging between 200° F. to 320° F. and pressure of 170 to 250 lbs./in.$^2$ using an autoclave.

In producing colored films by the gravure procedure outlined above, at least one serious difficulty is encountered to wit: the seasoning process, and incidentally the laminating step which is later to be utilized, involve application of heat sufficient to occasion degradation of the inks as witnessed by the colors being faded and broken after their being subjected to the same.

Accordingly, it is a principal object of the present invention to provide thermally-stable inks which can be used in printing on polyvinyl butyral sheets.

Another object is to provide thermally-stable printing inks suitable for use in processes involving rotogravure-type printing followed by heat-treatment.

Another object is to provide unitary light transmitting laminates comprising pairs of glass sheets laminated together through interposed tinted or colored sheets of polyvinyl butyral.

Other objects of the present invention will in part be obvious and will in part appear hereinafter.

These and other objects are attained by an ink comprising polyvinyl butyral resin, dye, solvent for said resin and said dye and a thermal stabilizer.

The folowing examples are given to illustrate the invention and are not intended as limitations thereof. Unless otherwise indicated, the polyvinyl butyral sheets referred to throughout these examples are composed of plasticized polyvinyl butyral resin extruded in the form of a sheet. The resin used to make the sheet has an Alkalinity Titer of approximately 20, a moisture content of 2.0%, a Staudinger molecular weight of approximately 200,000, and contains approximately 19% hydroxyl groups calculated as polyvinyl alcohol and aproximately 2% acetate groups calculated as polyvinyl acetate, the balance being substantially butyral. Prior to extruding the sheet, 42 parts of triethylene glycol-di-(2-ethyl butyrate) plasticizer is admixed with 100 parts of the polyvinyl butyral resin. The Alkalinity Titer as used herein is an arbitrary standard generally used in the safety glass industry and is defined as the number of milliliters of 0.01 normal hydrochloric acid required to neutralize a 100 gram solution of the resin (a 3% methanol solution) to a neutral end-point using brom-phenol blue indicator. Unless otherwise specified, quantities are mentioned on a weight basis.

*Example I*

A printing ink is prepared by dissolving 4.1 parts of polyvinyl butyral and 1.7 parts of triethylene glycol-di-(2-ethyl-butyrate) in 70 parts of propylene dichloride and 30 parts of butanol. To the resulting solution add 1.6 parts of Ero blue (1-methyl-amino-4-isopropylamino anthraquinone) and 4.5 parts of Calco Oil Yellow (Color Index Solvent Yellow 46).

The preceding ink is divided into eight (8) equal aliquots. The first of these is retained as a control while to each of the others, 5 parts, per 100 parts of each aliquot, of each of the thermal stabilizers identified below are added. Each of the aliquots (including the control) is then printed onto 15 mil. thick plasticized polyvinyl butyral sheets using a rotogravure printing machine to effect a green coloration thereon. The sheets are then dusted with bicarbonate of soda and rolled up, and in this condition subjected to a temperature of about 100° C. for 24 hours. Thereafter inspection of the sheets lends the following results:

| Sample | Thermal Stabilizer | Color |
| --- | --- | --- |
| 1 | None | Blue. |
| 2 | 2,2-bis-(4-hydroxyphenyl)propane | Green. |
| 3 | 2,6-ditertiary butyl p-cresol | Do. |
| 4 | 1,1'-bis-(2-hydroxy-3-tertiary butyl-5-ethyl phenol) methane | Do. |
| 5 | 1,3-dimethyl thiourea | Do. |
| 6 | Tri-isooctyl phosphite | Do. |
| 7 | 2-(ethyl-n-butyl amino) ethyl amine | Do. |
| 8 | N,N-diethyl-N'-methylethylene diamine | Do. |

Maintenance of green coloration in Samples 2–8 above indicates that thermal-stability has been contributed to the inks by the inclusion of the identified thermal stabilizers.

*Example II*

A printing ink is prepared by dissolving 4.1 parts of polyvinyl butyral and 1.7 parts of triethylene glycol-di-(2-ethyl-butyrate) in 83 parts of cyclohexanone and 17 parts of butanol. To the resulting solution add 1.6 parts of Dupont Oil Blue A (Color Index Solvent Blue 36) and 4.5 parts of Calco Oil Yellow (Color Index Solvent Yellow 46).

The preceding ink is divided into eight (8) equal aliquots. The first of these is retained as a control while to each of the others, 5 parts, per 100 parts of each aliquot, of each of the thermal stabilizers identified below are added. Each of the aliquots (including the control) is then printed onto 30 ml thick plasticized polyvinyl butyral sheets using a rotogravure printing machine to effect a green coloration thereon. The sheets are then dusted with bicarbonate of soda and rolled up, and in this condition subjected to a temperature of about 100° C. for 24 hours.

Thereafter inspection of the sheets lends the following results:

| Sample | Thermal Stabilizer | Color |
| --- | --- | --- |
| 1 | None | Blue. |
| 2 | 2,2-bis-(4-hydroxyphenyl)propane | Green. |
| 3 | 2,6-ditertiary butyl p-cresol | Do. |
| 4 | 1,1'-bis-(2-hydroxy-3-tertiary butyl-5-ethyl phenol) methane. | Do. |
| 5 | 1,3-dimethyl thiourea | Do. |
| 6 | Tri-isooctyl phosphite | Do. |
| 7 | 2-(ethyl-n-butyl amino) ethyl amine | Do. |
| 8 | N,N-diethyl-N'-methylethylene diamine | Do. |
| 9 | Triphenyl phosphite | Do. |
| 10 | Ethyl diphenyl phosphite | Do. |

Maintenance of green coloration in samples 2–8 above indicates that thermal-stability has been contributed to the inks by the inclusion of the identical thermal stabilizers.

*Example III*

Two plasticized polyvinyl butyral sheets, Nos. 1 and 2, are produced by intimately mixing 42 parts of triethylene glycol di(2-ethyl butyrate) plasticizer and extruding the resulting mixture in the form of a 15 mil thick plastic sheet. The manufacturing procedure for both sheets is identical except that the resin used to produce sheet No. 1 contains 0.2% para-tertiary amyl phenol resin stabilizer. The resin used to produce sheet No. 2 does not contain a resin stabilizer. Viscosity tests are run on both sheets by first conditioning the sheets for 4 hours at 90° C. and then dissolving 10 grams of each sheet with 100 grams of methanol and testing the resulting solutions using a No. 100 Series Ostwalk-Fenske viscosimeter. More specifically, this involves measuring the time of flow of the solution through a capillary tube at 20±1° C. It is found that sheet No. 2 measures only 100 centipoise as opposed to 185 centipoise obtained on the resin stabilizing polyvinyl sheet No. 1 demonstrating the effectiveness of the resin stabilizer which was used.

Both sheets are then separately printed in the same manner using the same stabilizers as Example I. It is found that the color results obtained on both sheets are the same—demonstrating that the resin stabilizer had little or no effect on the dye used to print the sheet. Furthermore, the results indicate that color stability is obtained solely by the use of the particular ink thermal stabilizers described and claimed.

The resins used in providing the inks of the present invention are polyvinyl butyral resins containing up to 25% hydroxyl groups calculated as polyvinyl alcohol, up to 10% acetate groups calculated as polyvinyl acetate with the balance of the resin being polyvinyl butyral. The amount of resin to be used generally ranges between 25 to 100% based on the weight of the dyestuff.

When the inks are designed for printing on plasticized polyvinyl butyral resin sheets for safety glass purposes, it is recommended that from 20 to 80 parts of plasticizer be included per 100 parts of resin. Preferably, the plasticizer should be similar to that already present in the sheet designed for printing. Typical plasticizers used to produce the sheet and which can be used in the ink include triethylene glycol-di-(2-ethyl butyrate), dibutyl sebacate, dibutyl Cellosolve adipate and others.

The dyes prescribed for use are those which contain 2 to 4 cyclic nuclei in the dyestuff molecule as defined and claimed in U.S. 2,739,080 issued Mar. 20, 1956 on application of Chester L. Woodworth. By cyclic nuclei are meant aromatic nuclei such as benzene, naphthalene, anthracene, etc., nuclei and heterocyclic nuclei such as pyrazolone rings. Dyes of this type are soluble in chlorinated hydrocarbon or ketone solvents. Examples of these dyestuffs are Ero Blue (1-methyl-amino-4-isopropylamino anthraquinone), Kohnstamm Orange (Color Index No. 24), Calco Oil-soluble Yellow (Color Index Solvent Yellow 46), DuPont Oil Blue A (Color Index Solvent Blue 36), etc. and various mixtures of the same. The amount of dye used will depend upon the color and intensity of the same desired.

The solvent for the resin and the dye can be a single solvent or mixture of solvents. Single solvents which can be used are ketones such as cyclohexanone in which both the stabilized resin and dye are soluble. Mixed solvents which can be used include mixtures of alcohols with chlorinated hydrocarbons and ketones and others. Examples of the mixed solvents include propylene dichloride-butanol, cyclohexanone-butanol, dimethyl-formamide-xylene, dimethylformamide-toluene, also acetone or methylethyl ketone, etc., in admixture with butanol and the like. The type and amount of solvent to be used will depend upon the compatibility of the same with the dyestuff and the resin, as well as the physical characteristics thereof such as viscosity, volatility depending upon the particular printing process and apparatus designed for use. For printing in accordance with the gravure process set forth earlier, the viscosity of the ink is proposed to be limited to between 10 to 500 cps. In general, the amount of solvent will vary between 1500 and 4000 parts per 100 parts of resin present.

The thermal stabilizers suggested for use in the inks of the present invention include alkyl substituted amines, alkyl substituted phenols, alkyl substituted thioureas, alkyl, aryl and alkyl-aryl substituted phosphite compounds and mixtures of the same. Amounts of thermal stabilizer to be used range between 25 to 350 parts per 100 parts of dyestuff.

The polyvinyl butyral sheets are produced by the addition of 20 to 80 parts of a compatible plasticizer to 100 parts of polyvinyl butyral resin and shaping the resulting mixture into sheet form by any suitable means, i.e., extrusion, casting, etc. The polyvinyl resin can vary in molecular weight (Staudinger) from 150,000 to 250,000 and preferably contains 16 to 25% hydroxyl groups, calculated as polyvinyl alcohol and from 0–10% acetate groups, calculated as polyvinyl acetate, the balance being substantially butyraldehyde.

Inks, produced in accordance with the preceding, transfer smoothly and completely from an etched or otherwise engraved printing roll to polyvinyl butyral sheets. They can be used in processes designed to provide either complete or gradated tinting or coloring effect on the sheets. They can also be used in processes designed to provide distinctive designs on the sheets provided that the etching of the printing rolls is sufficiently distinctive. With seasoning, the tinting or coloring is diffused into the sheets as to contribute a continuous tinted or colored effect, while nevertheless, retaining the relative magnitude of tinting or coloring as printed on in various parts of the sheet. The polyvinyl butyral sheets which result can then be used in laminating glass sheets to form glass panels exhibiting good adhesion between the individual glass sheets.

It will thus be seen that the objects set forth above among those made apparent from the preceding description are efficiently attained, and, since certain changes may be made in the inks or in the printing and other methods for their preparation, without departing from the scope of the invention, it is intended that all matter contained in the above description shall be interpreted as illustrative and not in a limiting sense.

What is claimed is:

An ink of improved thermal stability adapted for gravure printing on polyvinyl butyral sheets the said ink having a viscosity of 10 to 500 cps. and comprising an admixture of (a) a dye selected from the class consisting of dyestuffs having 2 to 4 cyclic nuclei in the dye molecule and mixtures of the same, (b) 25 to 100% by weight of a polyvinyl butyral resin based on the weight of said dyestuff, the said resin containing up to 25% hydroxyl groups calculated as polyvinyl alcohol and up to 10% acetate groups calculated as polyvinyl acetate, (c) 1500 to 4000 parts by weight based on 100 parts by weight of said resin of a solvent for said resin and said dye and (d)

25 to 350 parts by weight based on 100 parts by weight of the dyestuff of the thermal stabilizer tri-isoctyl phosphite.

References Cited

UNITED STATES PATENTS

| | | | |
|---|---|---|---|
| 2,216,020 | 9/1940 | Norlander et al. | 260—45.9 |
| 2,487,446 | 11/1949 | Kellog et al. | 96—56 |
| 2,640,044 | 5/1953 | Stamatoff | 260—45.7 |
| 2,688,625 | 9/1954 | Bell et al. | 96—56 |
| 2,700,028 | 1/1955 | Jarbol et al. | 260—45.95 |
| 2,739,080 | 3/1956 | Woodworth | 260—45.95 |
| 2,862,908 | 12/1958 | Jones et al. | 260—45.95 |

FOREIGN PATENTS

| | | |
|---|---|---|
| 748,856 | 5/1956 | Great Britain. |
| 787,161 | 12/1957 | Great Britain. |

MORRIS LIEBMAN, *Primary Examiner.*

K. B. CLARKE, J. S. WALDRON, J. H. DERRINGTON, *Assistant Examiners.*